Feb. 27, 1940.    W. F. ERRIG ET AL    2,192,130
AUTOMATIC SLOTTER FOR TIRES
Filed Dec. 23, 1935    9 Sheets-Sheet 1
FIG. I.
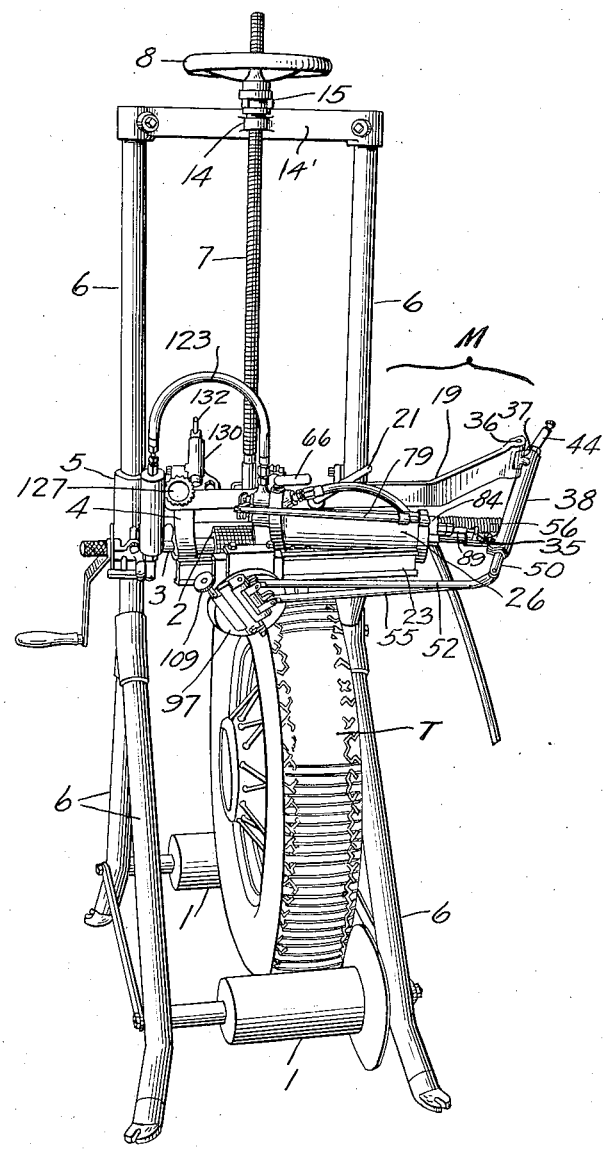
INVENTORS:
William F. Errig &
George M. Pfundt,
BY *Alfred J. Bratton*
THEIR ATTORNEY.

Feb. 27, 1940. W. F. ERRIG ET AL 2,192,130
AUTOMATIC SLOTTER FOR TIRES
Filed Dec. 23, 1935 9 Sheets-Sheet 2
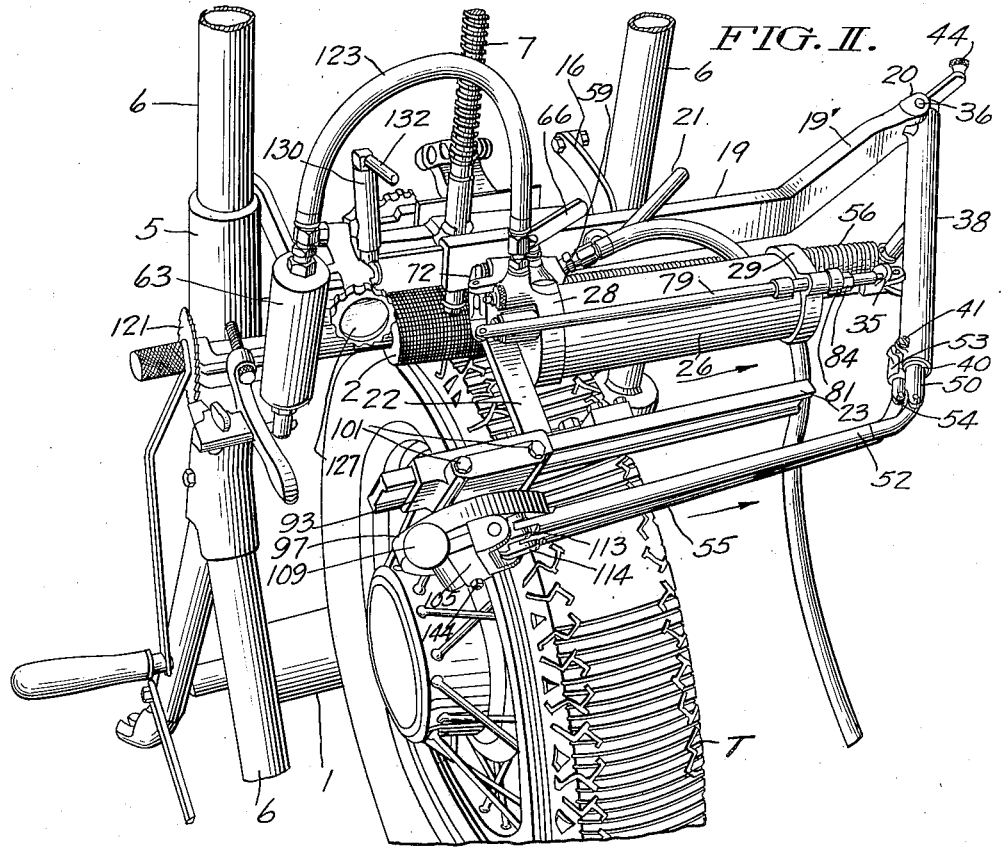
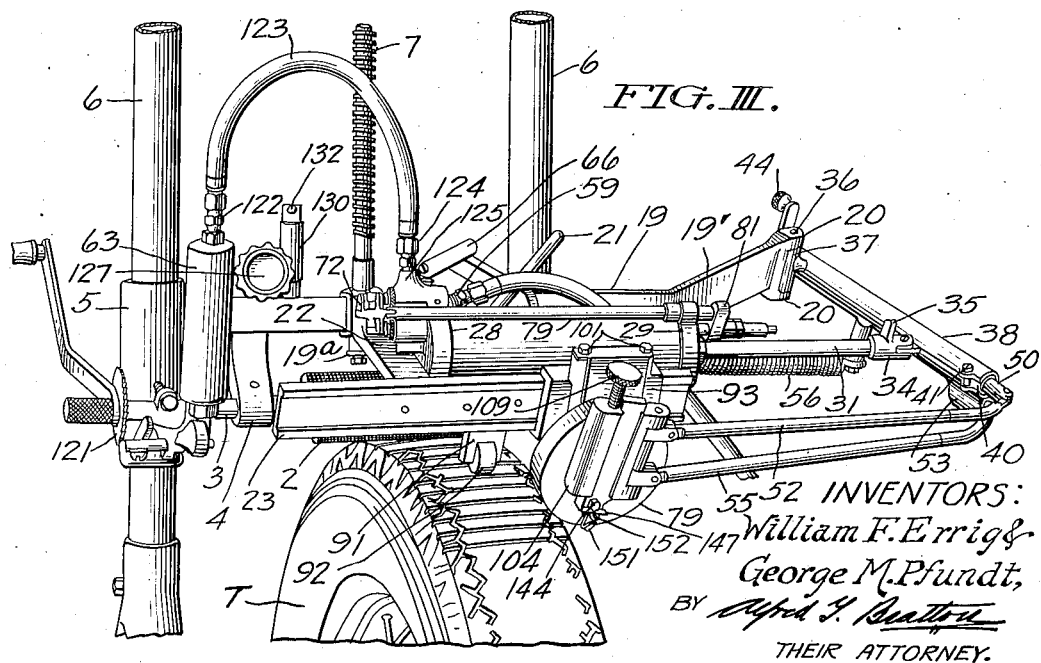
INVENTORS:
William F. Errig &
George M. Pfundt,
BY Alfred Y. Beatton
THEIR ATTORNEY.

Feb. 27, 1940.  W. F. ERRIG ET AL  2,192,130
AUTOMATIC SLOTTER FOR TIRES
Filed Dec. 23, 1935  9 Sheets-Sheet 3
FIG. IV.
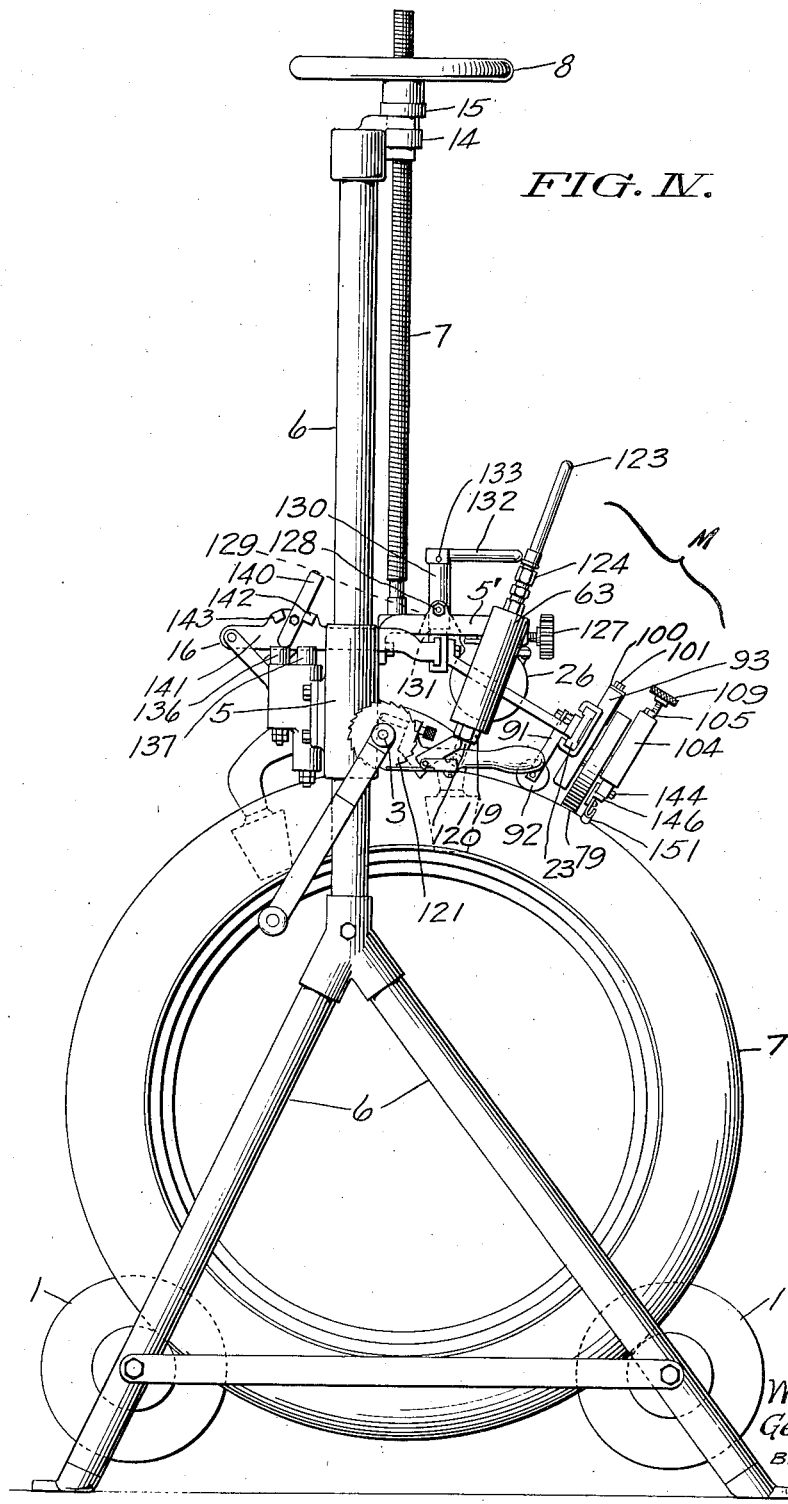
INVENTORS:
William F. Errig &
George M. Pfundt,
BY
THEIR ATTORNEY.

Feb. 27, 1940.  W. F. ERRIG ET AL  2,192,130
AUTOMATIC SLOTTER FOR TIRES
Filed Dec. 23, 1935    9 Sheets-Sheet 4
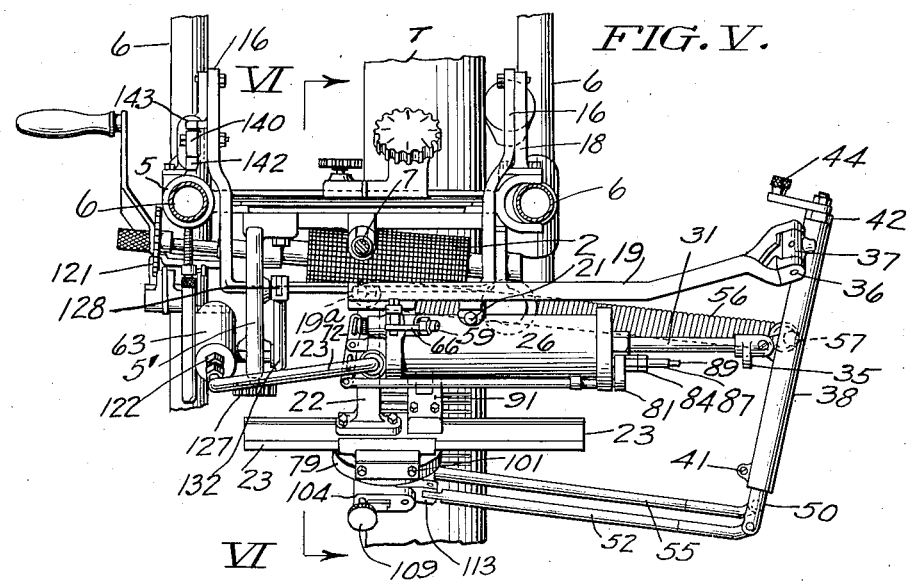
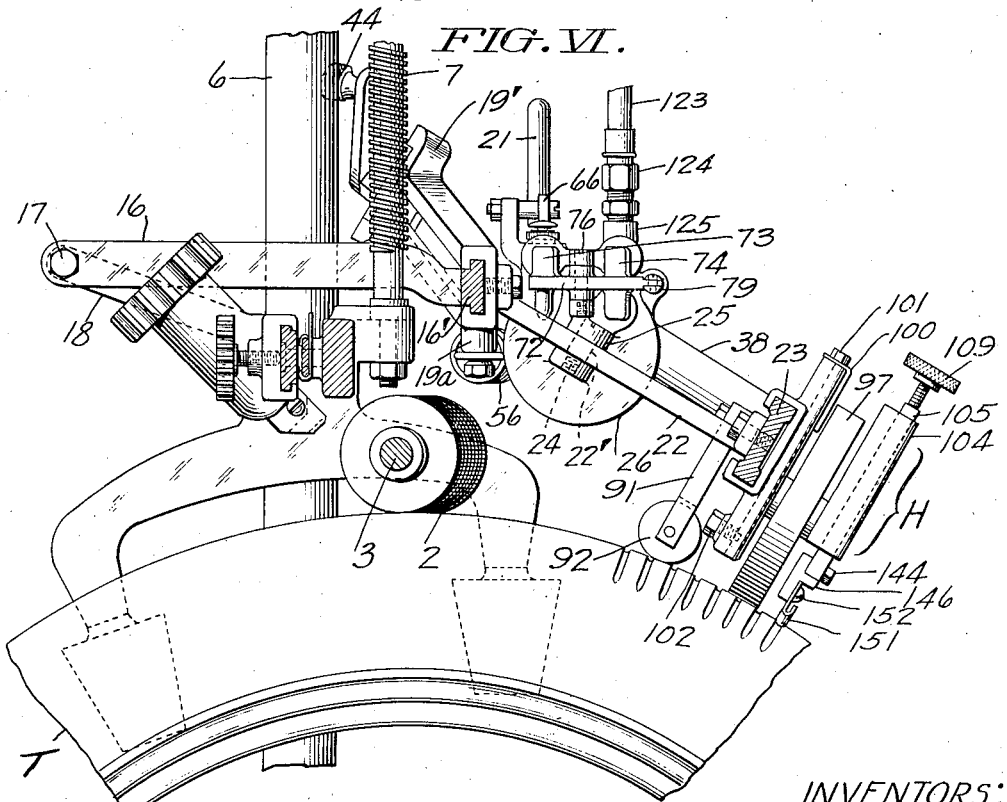
INVENTORS:
William F. Errig &
George M. Pfundt,
BY Alfred J. Bratton
THEIR ATTORNEY.

Feb. 27, 1940. W. F. ERRIG ET AL 2,192,130
AUTOMATIC SLOTTER FOR TIRES
Filed Dec. 23, 1935 9 Sheets-Sheet 5
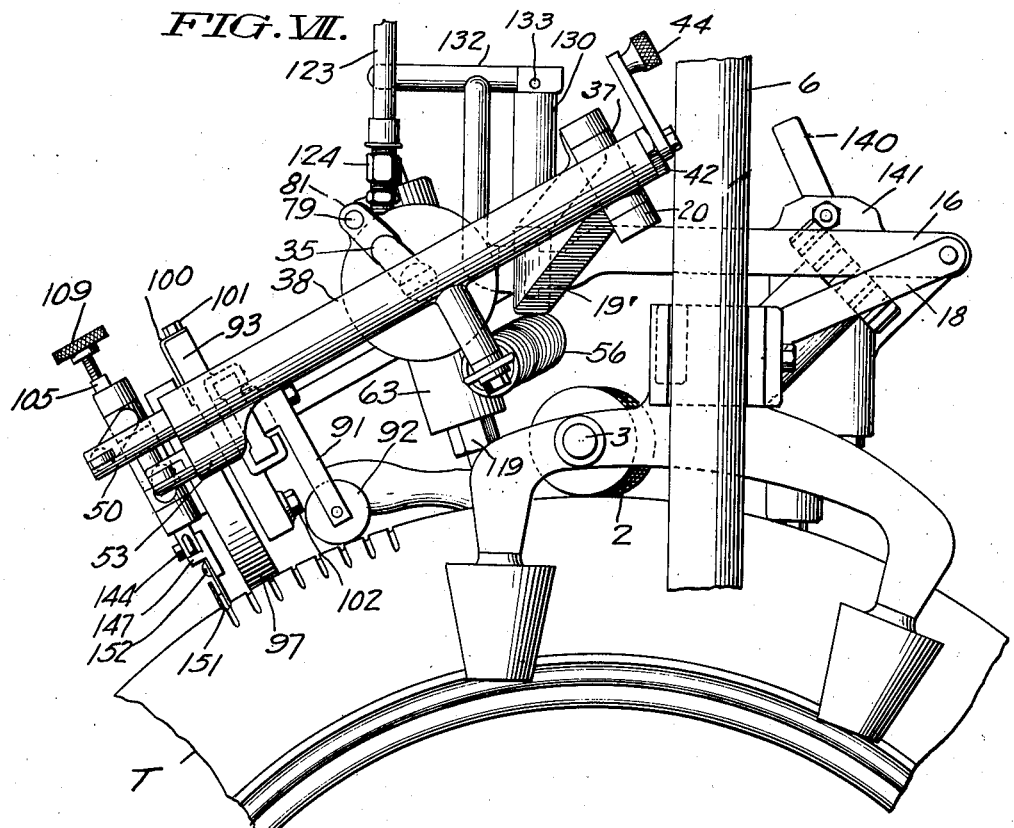
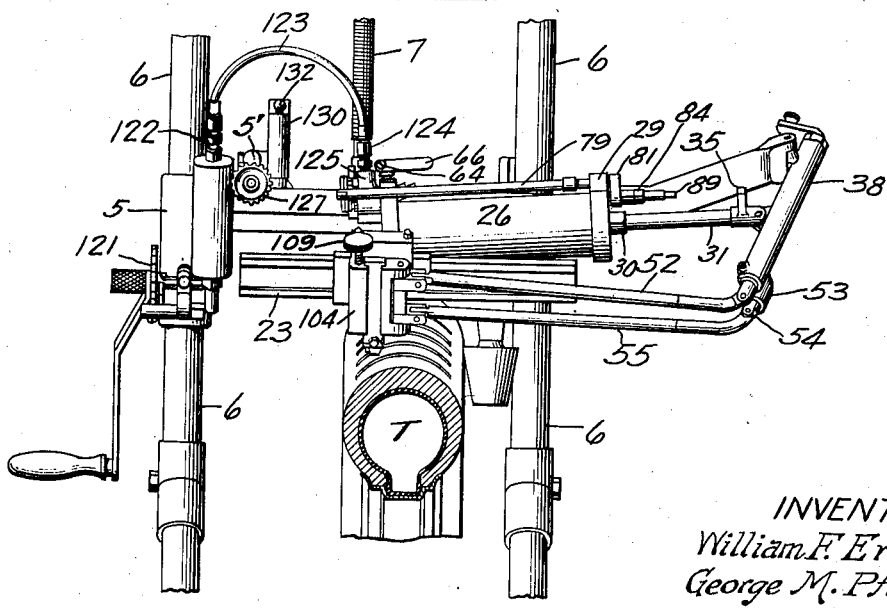
INVENTORS:
William F. Errig &
George M. Pfundt,
BY Alfred T. Beatton
THEIR ATTORNEY.

Feb. 27, 1940.  W. F. ERRIG ET AL  2,192,130
AUTOMATIC SLOTTER FOR TIRES
Filed Dec. 23, 1935    9 Sheets-Sheet 6
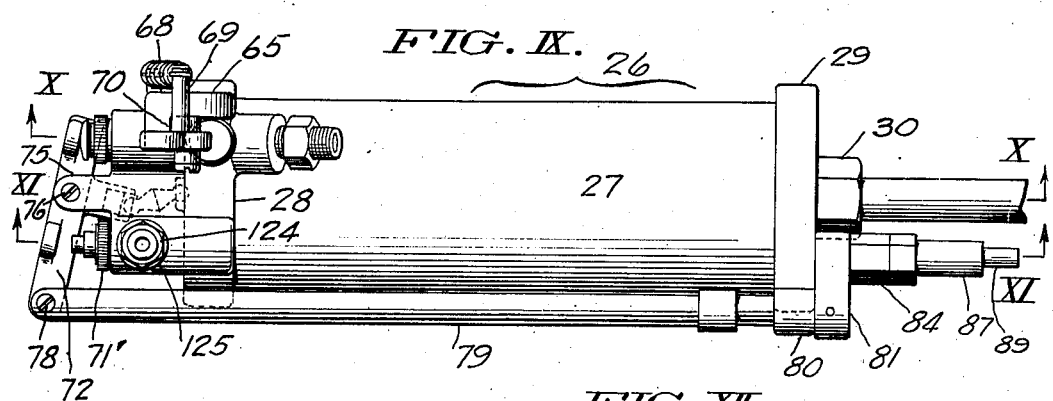
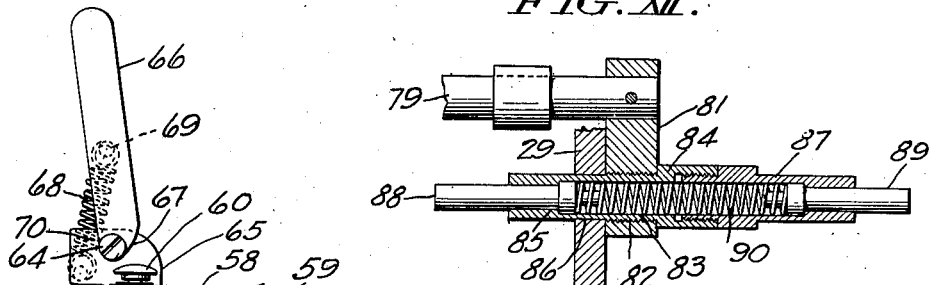
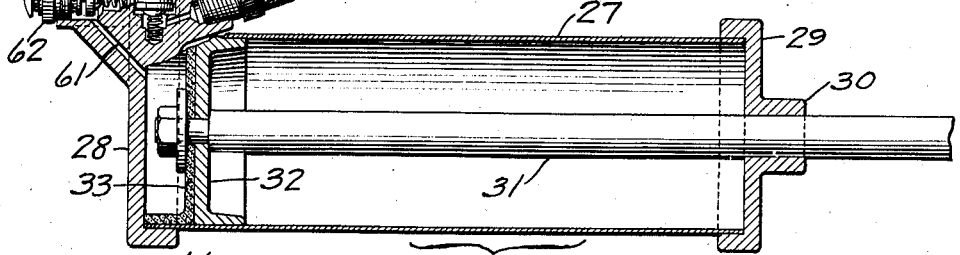
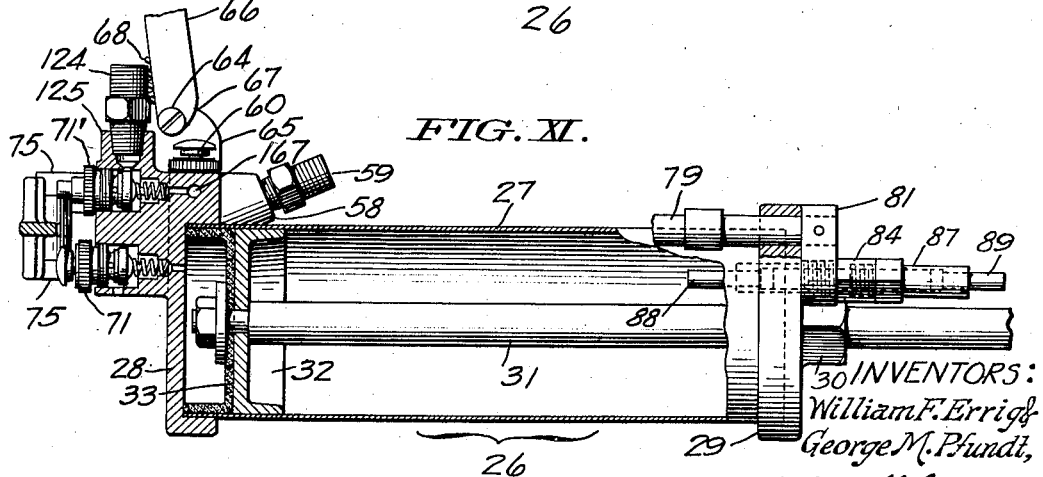
INVENTORS:
William F. Errig &
George M. Pfundt,
BY Alfred J. Bratton
THEIR ATTORNEY.

Feb. 27, 1940.  W. F. ERRIG ET AL  2,192,130
AUTOMATIC SLOTTER FOR TIRES
Filed Dec. 23, 1935  9 Sheets-Sheet 7
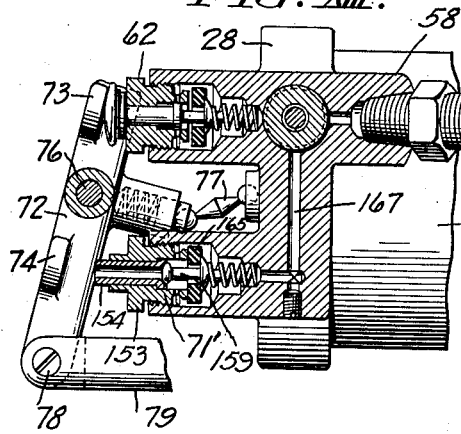
FIG. XIII.
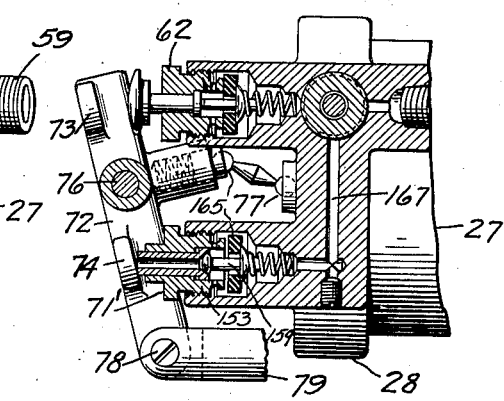
FIG. XIV.
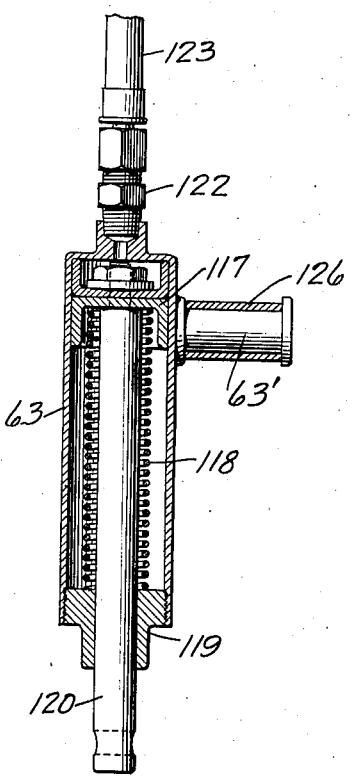
FIG. XV.
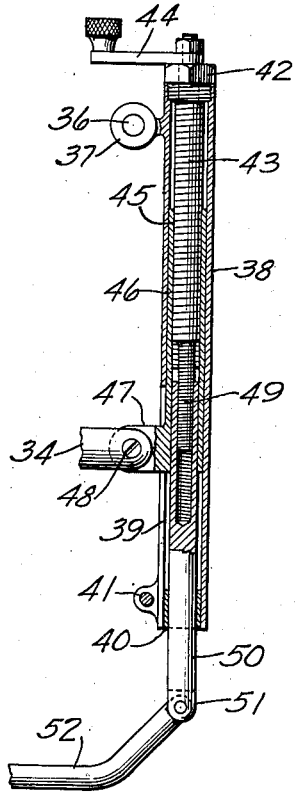
FIG. XVI.
INVENTORS:
William F. Errig &
George M. Pfundt,
BY Alfred Y. Bratton
THEIR ATTORNEY.

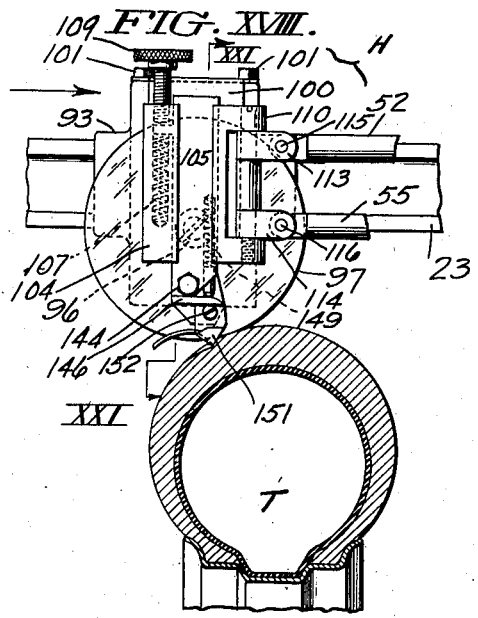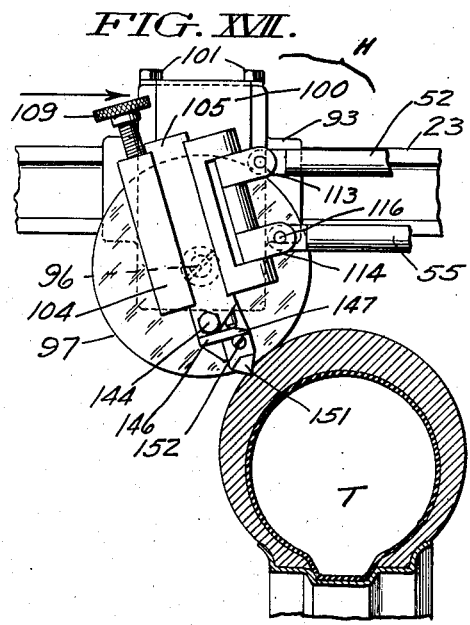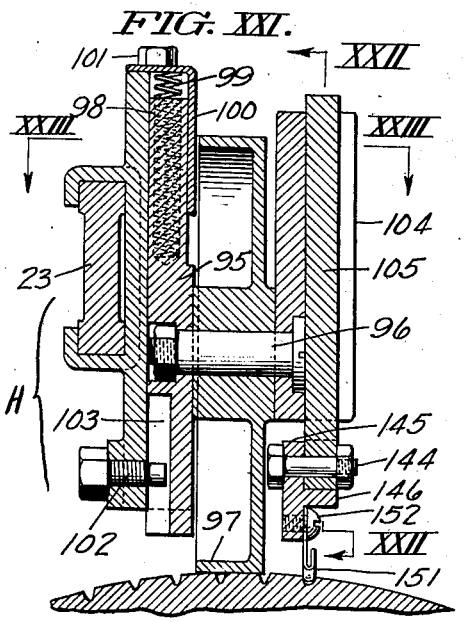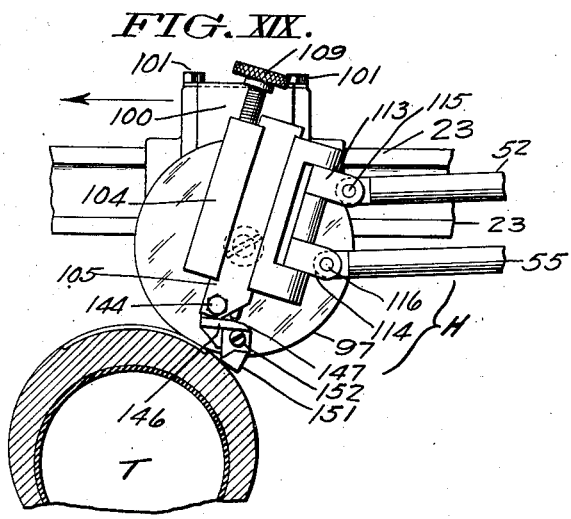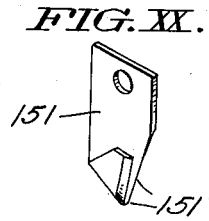

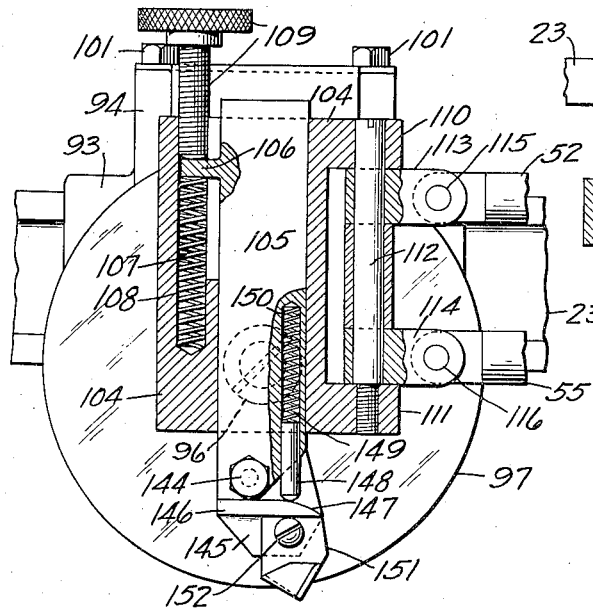
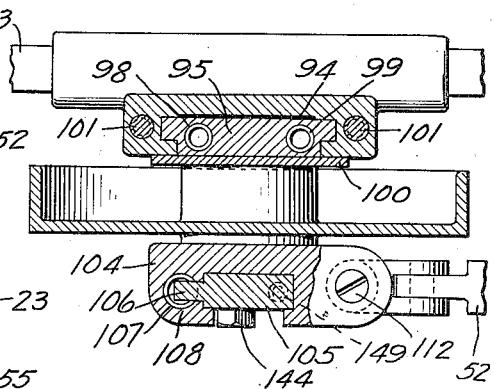
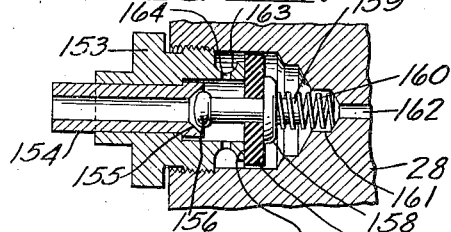
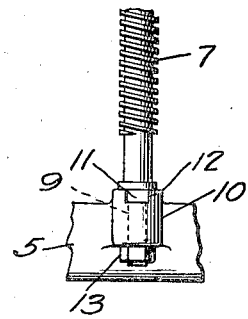
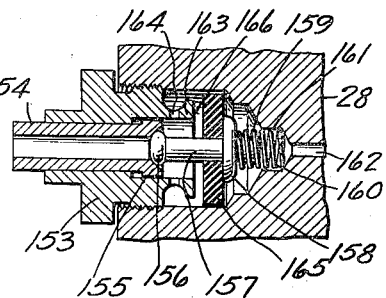

Patented Feb. 27, 1940

2,192,130

UNITED STATES PATENT OFFICE 2,192,130

AUTOMATIC SLOTTER FOR TIRES

William F. Errig, Philadelphia, and George M. Pfundt, Churchville, Pa., assignors to Peco Manufacturing Corporation, Philadelphia, Pa., a corporation of Pennsylvania Application December 23, 1935, Serial No. 55,688

23 Claims. (Cl. 90—24)

This invention relates in its broader aspects to means for grooving the tread surface of tires and, more particularly, to the re-grooving of tires which have become smooth by wearing away of the original non-skid tread portion.

More specifically the present invention has reference to a novel means for transversely slotting the tread surface of rubber tires initially, or when worn smooth, and it has for a primary object to groove or slot the tread surface of tires in a manner whereby "skidding" is reduced to the minimum, while the brake efficiency of the tire and its acceleration capacity are substantially enhanced.

Another object is the provision of a novel mechanism whereby the lateral or transverse grooving or slotting tool can be adjusted and maintained at the requisite arcual-stroke and cutting-angle relative to the curvature of the tire tread.

A further object is to provide mechanism whereby the depth of the groove or slot made by the cutting tool is set and evenly maintained transversely of the tire tread surface.

A still further object is the provision of a tire groover or slotter in which the cutting-stroke is power actuated and the return stroke reactive.

Another object is the provision of a tire groover or slotter in which the power influence effecting the cutting stroke is automatically diverted, on completion of said stroke, to effect rotary progression of the tire and definite spacing of the grooves or slots cut.

A still further aim of this invention is to provide an automatic mechanism which is capable of cross-grooving or slotting a tire tread, whether new or worn, in a minimum of time, and with an appreciable saving of overhead and labor expenses.

Another aim of the present improvements is to provide a tire cross-groover which is comparatively simple and inexpensive to manufacture, positive and effective in action; and that lends itself readily for application to and cooperation with a tire groover of the type disclosed in prior Patent No. 1,916,258, granted to the present applicants, under date of July 4, 1933.

Other objects, and ancillary advantages, of the present invention will be hereinafter pointed out, or become apparent from the following disclosure of a preferred embodiment of the invention, when read in connection with the accompanying sheets of drawings; while it is to be distinctly understood the subject-matter hereof is not confined to the exact features shown and explained, various changes being readily made within the scope of the claims, without departure from the spirit of said invention or the sacrifice of any of its advantages.

In all the views of the drawings corresponding parts are designated by similar reference characters.

Fig. I is a perspective view of a tire-groover in accordance with above referred to prior patent and having the novel mechanism of this invention applied thereto, and in position for commencing its active stroke.

Fig. II is a perspective view of the automatic cross-groover or slotter of this invention, drawn to a larger scale, with associated parts of the patented machine, and said slotter in position to commence its active or cutting-stroke.

Fig. III is a similar view to the preceding but illustrating the groover or slotter in the position occupied on completion of its active stroke, or ready for the return stroke.

Fig. IV is a side elevation looking toward the right hand of Fig. I.

Fig. V is a plan view of the novel cross-groover or slotter.

Fig. VI is a sectional elevation taken on the plane designated VI—VI in Fig. V, and drawn to a larger scale for clarity.

Fig. VII is an elevation looking to the left of Fig. V and drawn to the same scale as Fig. VI.

Fig. VIII is a front elevation as viewed from below Fig. V.

Fig. IX is a plan view of the power mechanism hereinafter fully described.

Fig. X is a staggered longitudinal section along the plane X—X of Fig. IX.

Fig. XI is a similar section on the plane XI—XI of Fig. IX.

Fig. XII is an enlarged sectional detail of a stopping mechanism, later on fully described.

Fig. XIII is a sectional plan view of the novel valve mechanism at the left hand of Figs. IX-XI.

Fig. XIV is a similar sectional view but showing the parts in a different position.

Fig. XV is an axial section of a ratchet-feed controlling-device whereby the tire is intermittently rotated to effect definite-spacing of the grooves or slots cut.

Fig. XVI is a detail sectional view of the cutter controlling member or radius rod for regulating the stroke and angularity of the cutter.

Fig. XVII is a detail view of the cutter head in position ready to commence cutting a groove or slot transversely of a tire.

Fig. XVIII is a similar view to Fig. XVII but showing the parts in a different position.

Fig. XIX is a like view to Figs. XVII and XVIII but showing the position of the parts after completion of the cross-cut.

Fig. XX is a perspective view of a preferred form of cutting blade.

Fig. XXI is a vertical section on the plane XXI—XXI of Fig. XVIII but drawn to a larger scale.

Fig. XXII is a section on the plane XXII—XXII of Fig. XXI.

Fig. XXIII is a cross section on the plane XXIII—XXIII of Fig. XXI.

Fig. XXIV is a detail view of a variable cushioning means, later on fully described.

Fig. XXV is a detail view of the lower end of an elevating screw-shaft, hereinafter referred to.

Fig. XXVI is a longitudinal section through a "special" valve, hereinafter described, in the open position; and, Fig. XXVII is a similar section of the valve in closed position.

Referring first to Figs. I and IV more particularly, wherein the mechanism of this invention is comprehensively designated as M and shown as applied to a tire circumferential grooving machine as disclosed in the hereinbefore referred to prior patent, the same including freely-rotative tire-supporting rollers 1, a drive roller 2 on the cross-shaft 3, journaled in brackets 4, on a vertically adjustable carrier 5, mounted between standards 6; said carrier being raised or lowered by means of a screw shaft 7 and hand-wheel 8.

The screw-shaft 7, in accordance with the present invention, is formed at its lower end with a reduced portion 9, Fig. XXV for passage through an apertured lug 10 on the carrier 5; and it is also formed with one or more radial projections 11 engageable in a complemental notch 12, in said lug, to prevent its rotation; while the reduced portion is provided with an appropriate locking means 13, whereby the carrier 5 can be raised and lowered simultaneously with the screw-shaft 7. The upper part of the screw-shaft 7 is guided through an apertured lug 14 on the standard brace or head-piece 14', while the hand-wheel 8 is supported by a suitable thrust-bearing 15 to reduce friction thereat, in an obvious manner.

The novel cross-grooving or slotting mechanism M comprises a stirrup or U-shaped support 16 having the free ends of its leg portions suitably fulcrumed at 17 to brackets 18 formed integral with or secured at the back of the carrier 5. From Fig. VI it will be best seen that the intermediate portion 16' of the support 16, is of somewhat T-shaped cross-section for lapping engagement by a longitudinally grooved bar 19, having an angled extension 19' terminating in spaced ears 20. Means, such as a turn-screw device 21 engaged through the bar 19 serve to clamp the latter firmly to the support 16, and for a centralizing purpose later on explained.

Forwardly projecting from the grooved bar 19 is a bracket 22, having at its free end a rail or track bar 23 affording reciprocating support for the cutter head, comprehensively designated as H. Intermediate its ends the bracket 22 is pierced at 22' for reception of a pivot pin 24 affording connection by means of spaced ears 25, for a power cylinder 26. This power cylinder 26 comprises a body portion 27 with end closures 28, 29, the former of which is provided with the spaced ears 25, while the latter is axially formed at 30, for passage of the piston rod 31, fitted at its inner end with a piston 32, and a cupped-plunger 33 at the back thereof. The outer end of the piston rod 31 is provided with a bifurcated head-piece 34, and a projection 35 for purposes later explained.

Fulcrumed between the spaced ears 20 of the grooved bar extension 19', by means of a pivot pin 36 passing through a bearing 37, is a tubular arm 38, having that portion remote from said pivot pin, longitudinally slotted at 39 and fitted with a terminal bushing 40, adapted to be firmly held in place therein by a clamp device 41, of conventional character. Fitted in the pivotal end of the arm 38, is a removable bushing 42 affording journal bearing for a screw-rod 43, provided at its outer end with a turn key or crank 44. This screw-rod 43 threadedly engages the bore 45 of the inner tube 46 having a lateral ear 47 projecting outwardly through the tubular arm longitudinal slot 39, and apertured for connection by a pivot screw 48 between the piston rod bifurcated head-piece 34.

The screw-rod 43 is also reduced and differentially screw-threaded at 49 for engagement in the correspondingly-threaded bore of a tubular member 50, slidable through the terminal bushing 40 of the tubular arm 38, and said member 50 has a clevised end 51 for pivotal connection of a radius rod 52. Also secured in a projection 53 below the free end of the tubular arm 38 is a clevised stud 54 affording pivotal connection for a second radius rod 55, and the purposes of these rods 52, 55 will be later on fully explained; while a suitable recoil-spring 56 is anchored between a projection 57 integral with the tubular arm 38, and a stud 19ª below the left-hand end of the grooved-bar 19, as viewed in the drawings.

Referring again to the cylinder end closure 28, and as best understood from Figs. IX–XI and Figs. XIII, XIV, it will be seen, the same embodies a service connection 58 for attachment of a nipple 59 in communication with a source of motive medium (not shown), such as compressed air. In line with the service connection 58 is a spring-actuated "poppet" valve 60 controlling inlet-flow of the pressure medium by way of a duct or passage 61 with the cylinder 27; and an intake valve 62 of like type governing admission of the motive medium into the cylinder 27 for the power stroke; while a part of the pressure medium on the return stroke of the piston 32 is by-passed to a second power cylinder 63, governing operation of a racking mechanism adapted to turn the tire T intermittently with each power stroke of the piston 32.

Fulcrumed by a pivot pin 64 to an upstanding arm 65 on the closure end 28 is a trip 66 having a rounded part 67 for coaction with, and to effect closing of the "poppet" valve 60, as later on explained; while said trip 66 is influenced by a recoil spring 68 anchored thereto at 69 and to the arm 65. This trip 66, it will be remarked, has its pivotal end adapted to engage with a radial off-set portion 70 of the arm 65 whereby it is restrained in a position inclined to the vertical when thrown to one side of its pivot 64; while it is held in engagement with the head of the poppet valve 60 by the spring 68 to hold said valve open, as later on set forth. Also arranged in the closure end 28 is a cylinder exhaust valve 71 and a "special" exhaust valve 71', while actuation of the valves 62, 71 and 71', is under control of a rock lever 72, having tappet projections 73, 74, for respective coaction with said valves. The lever 72 is pivotally mounted between spaced ears 75 on the closure end 28 by a pin 76, and is subject to a conventional ball-and-socket "kicker" 77.

Pivoted at 78 to the free end of the lever 72 is a rod 79 slidably guided at its other end in an apertured projection 80 on the cylinder end closure 29, whereat it has secured thereto a block 81. This block 81 has screwed therethrough at 82, a tube 83 with a shouldered outer portion 84, while its inner end is reduced at 85 for drift passage through an aperture 86 in the end closure 29. Threadedly engaged in the shouldered outer end of the tube 83 is a tubular cap piece 87, and fitting both ends of the combined structure are plungers 88, 89, under outward-influence of a spring 90 in compression, the former of said plungers 88 being located within the power cylinder 27, and the latter 89 projected outwardly therefrom for coaction with the projection 35 on the piston bifurcated head-piece 34, hereinbefore referred to.

Referring back again to the rail or track 23 it will be seen the same is provided with a depending arm 91 affording free rotative support for a roller 92 adapted to ride over the tread of the tire T as the growing or slotting operation progresses, as well as supporting the cutter-head H in operative position on said tire. The cutter-head H, as best seen in Figs. XVII—XVIII, comprises a body portion 93 adapted for slidable engagement with the track 23, and a vertically grooved frontal portion 94, affording guidance for a slide member 95 having an axis pin 96 on which freely rotates a roller 97 adapted to follow the transverse or "arcual" curvature tread of the tire T to be grooved or slotted. The slide member 95 is provided with borings 98, to each side of the axis 96, in which are buffer-springs 99 held in place by an angled plate 100 secured to the body portion 93 by screw-studs 101.

Thus it will be seen that the slide member 95 and roller 97 are always resiliently-influenced toward the tire tread or transverse-curvature of the tire T, while said slide member is prevented from being forced away from the body portion 94 by a pin-and-slot connection 102, 103 respectively; said connection also making provision for easy removal of the slide member 95 when desired, as well as automatically accommodating variable depths of arcual groove or slot made by the device, as later on more amplified.

Fulcrumed on the head of the axis pin 96 is a grooved block 104 in which is fitted the cutter carrier 105, conveniently in the form of a slide having a lateral projection 106, seating on a spring 107 in a bore 108 in said block; and being adjustable by means of a turn-screw 109 in an obvious manner. Fulcrumed between lateral apertured projections 110, 111 integral with the block 104 by a pin 112, are pivotal clevis members 113, 114 to which the radius rods 52, 55, are respectively connected at 115, 116.

Referring again to the racking cylinder 63 the same is suitably supported by a pivot projection 63' to any convenient part of the carrier 5, or an attached angle-bracket 5', and it is fitted with a piston 117, under the influence of a spring 118, in compression between said piston and the end closure 119, through which the piston rod 120 projects and is operatively-coordinated with the drive roller shaft 3 and racking means 121; said racking means being conveniently in accordance with the disclosure in our prior Patent No. 2,015,635, dated September 13, 1934, and to which reference can be made as to its details, seeing that it forms no part of the instant case. The other end of the cylinder 63 is provided with a nipple 122 having a flexible connection 123 attached at its other end by a nipple 124 engaged in a branch 125 in communication with the "special" exhaust valve 71' hereinbefore referred to. Incidentally, the pivot projection 63' of the racking cylinder 63 is journaled freely in a sleeve 126, held in conformable cut-out in the end of the bracket 5', while the latter is rigidly secured against rotation by a turn-screw 127.

Pivoted at 128 to the bracket 5' with capacity for limited oscillation between stop portions 129 is a small cylinder 130 containing an outwardly influenced buffer 131, adapted to coact with the intermediate portion 16' of the U-shaped carrier support 16 to hold the roller 92 in contact with the tire T during the grooving or slotting operation. The buffer 131 is under control of a lever 132 pivoted to its stem at 133 and having an angled excentric end 134 for coaction with the top of the cylinder. Referring to Fig. IV it will be readily understood the parts are shown in operative relation; that is to say, with the lever 132 in horizontal position; and that if said lever be swung vertically on its pivot 133, the longer radius of the angled excentric end will engage the top of the cylinder 130 and cause the buffer 131 to be raised from engagement on the carrier support 16'; as well as permitting the cylinder being inclined to the vertical on its pivot 128 out of the path of movement of the carrier 16, when it is necessary to swing the latter upwards on its fulcrum points 17.

In order to counterbalance the mechanism M as a whole there is rigidly attached to the carrier 5 at the same side as the support 16 is pivoted or fulcrumed, a block 135, affording housing for two upwardly acting plunger stops 136, 137, the former being influenced by a spring 138 in compression sufficient to balance the mechanism M, and the latter under the action of a much stronger spring 139 serviceable to hold the stop 137 substantially rigid and functional to cause the mechanism M to be held stationarily elevated away from the tire T. For coaction with said plunger stops a rock bar or latch trip 140 is pivoted to an offset 141 on the proximate leg of the carrier 16, said offset having lateral stop portions 142, 143, with which the latch 138 engages when contacting the plunger stops 136, 137 respectively.

Pivotally fulcrumed to the lower end of the cutter carrier 105 by a bolt 144, Figs. XXI and XXII, is a shoe 145 having an offset flange 146 with a rounded end 147 for engagement by a plunger 148, under the influence of a spring 149 in a bore 150 provided for the purpose in the carrier 105. Thus it will be readily understood the plunger 148 tends to hold the shoe in the position of Fig. XXII with the flange 146 in abutment with the lower end of the carrier 105, while said flange also serves as a movement restraining abutment for the cutting tool or blade 151, preferably of the form shown in Fig. XX, and clamped therebelow by a screw stud 152 to the shoe 145. Obviously as the cutter 151 makes its grooving or slotting stroke it will be rigidly held, whereas on the return stroke it can ride harmlessly across the tire tread incident to counterclockwise movement on the pivot bolt 144 in opposition to the spring 149. It is to be particularly noted, at this juncture, that the cutter edge 151' is always adjused by the radius rods 52, 55 so as to have its cutting angle in radial alignment with the center of the tire arcual curvature being grooved or slotted.

Referring once again to the special valve 71', as best shown in Figs. XXVI and XXVII the same embodies a body portion 153 adapted for threaded engagement in the cylinder end closure 28; said body portion being axially bored for reception of a relatively movable tubular insert 154 having its inner end flared to form a valve seat 155 with which coacts the headed end 156 of a valve stem 157, whose other end is enlarged at 158 and provided with an extension 159, encircled by one end of a spring 160, whose other end is seated in a boring 161 provided for its reception in the end closure 28, and in flow communication by an orifice or passage 162 with the poppet valve 60, so readily understood from Figs. X and XI. The valve body portion 153 is circumferentially grooved at 163 and provided with radial holes 164 to afford exhaust passage therethrough to the tubular insert 154 when the valve is in the closed position of Fig. XXVI; whereas the stem 157 is fitted with a second valve member 165 for co-action with the end of the shouldered seat or flange 166 defined by the circumferential groove 163 aforesaid. When the headed end 156 of the valve stem 157 engages the insert tube seat 155 it will be obvious exhaust through the insert 154 is shut off with concurrent opening of the valve 71' for flow of the pressure medium to the racking control cylinder 63.

Having described the structural features of the invention its operation is briefly as follows:

Assuming a tire T is placed in the machine on the rollers 1, the operator releases the clamp device 21 and moves the mechanism M along the stirrup support 16, to the right or left hand and sets the roller 92 in the center of the tire tread, and re-sets or tightens up said device 21. The stirrup or U-bar carrier 16 is next released from its stationary position by snapping movement of the latch trip 140 from engagement with the stop 137 to that shown in Fig. XXIV, or into contact with the stop 136; whereupon the lever 132 is snapped down from the vertical to the horizontal position, as shown in the same view, whereupon the entire mechanism is firmly held with the roller 92 against the tread of the tire T. The stroke of the cutter 151 and correlative cutting angle thereof are next jointly "set" by manipulating the crank 44, and upon release of said crank the adjustment is restrained or locked automatically; such adjustment being effected through the mechanism described in connection with Fig. XVI and, preferably, "set" to commence about one-quarter of an inch to the left-hand of the tire section and terminate at a similar dimension beyond the right hand side thereof. The cutter is now backed-off once or twice to test the accuracy of its stroke. The trip 66 is thereupon snapped down into engagement with the pressure medium control poppet valve 60 and the mechanism M is automatically set in motion. Opening of the valve 60 admits fluid pressure by way of the intake valve 62 and passage 61 to the cylinder 27, as well as by way of a passage 167 for the power stroke, while the special valve 71' remains closed, cutting off supply to the cylinder 63. As the piston 32 in the cylinder 27 is moved by the pressure medium forwardly, for the power or cutting-stroke, it will, as it approaches the right-hand end of said cylinder, contact the plunger 88 and move the rock lever 72, by means of the parts 81, 79 hereinbefore explained, which movement of said rock lever closes the intake valve 62, by impact of the lever tappet 73, to the cylinder 27. Concurrent with the movements just described, the cylinder exhaust valve 71 will be opened by the tappet 74, and consequent movement inwards of the "special" valve tubular insert 154 pushing the valve 165 away from its seat 166, as clearly shown in Fig. XXVII. Movement of the valve 165 in the manner just explained diverts or by-passes pressure medium, as aforesaid, by way of the connection 123 to, and for, the power stroke of the piston 117 in the racking mechanism operating cylinder 63, whereby the tire is rotatively advanced, the required distance or spacing for the successive grooves or slots being transversely cut in its tread concurrently with the return stroke of the cutter 151, under the recoil action of the spring 56. With return of the piston 32 incidental to engagement of the head-piece projection 35 at the outer end of the piston rod 31, with the plunger 89, the rod 79 effects reverse movement of the rock lever 72 and automatic re-opening of the valve 62 and closing of the exhaust valve 71 ready for the next power stroke of said piston, while the special valve 71' shuts off passage of further power medium to the racking cylinder 63, and opens the tubular insert 154 for exhaust, with automatic return of the piston 117 by expansion of the spring 118.

From the foregoing explanation it will be clearly apparent the mechanism M will continue in automatic operation until the cross-grooving or slotting cycle is completed, or the motive medium is shut off by moving the starting trip 66 into vertical position. Furthermore, it is to be particularly remarked that the plunger stops 88, 89 and the "kicker" 77 function to give impetus to the starting and termination of each power and return stroke of the piston 32, and simultaneously a similar effect with respect to the action of the cutter 151; or said plunger stops 88, 89, positively insure full effective completion of the cutting-stroke and its return.

In conclusion it will be apparent that the illustrated form of the invention herein disclosed is well calculated to automatically carry out the cross-grooving or slotting of new and worn tires; also that it adequately fulfills all of the objects set forth in the prefatory paragraphs of this specification; while it will be equally evident that many structural changes and other apparently different embodiments thereof may be carried out without departing from the scope of the invention as described. It is accordingly intended that all matters contained in the foregoing specification, and shown by the accompanying drawings shall be interpreted as illustrative only and not in a limiting sense, while the scope of the following claims is similarly restricted only by such limitations as are demanded by the prior art.

Having thus described the invention, we claim:

1. In apparatus for treating the surface of a tire to increase the non-skid properties thereof, a base, means for rotatably supporting said tire on said base, a cutting member mounted adjacent the tire and adapted to move in an arcuate path determined by the surface of the tire, and fluid pressure power means including a cylinder and a piston reciprocable therein for alternately moving the cutter along said arcuate path to cut the tire and indexing the tire to a new cutting position.

2. In apparatus of the class described, a frame, means for rotatably mounting a tire on said frame, indexing mechanism for the tire, a cutter mounted on said frame for reciprocating movement, and means including a pivotally mounted motor for reciprocating said cutter in an arcuate path conforming substantially to the surface of said tire and determined by said tire.

3. In apparatus for treating the surface of a tire to improve its non-skid properties, a carrier member adapted for pivotal connection to a rigid support, a track spacedly related to the carrier member, a cutter carrier reciprocally and pivotally carried by the track, and power means whereby reciprocation of the cutter carrier in one direction is effected.

4. In apparatus for treating a tire to increase the non-skid properties thereof, the combination of a track supported adjacent the tire, a carriage movably mounted on said track, a cutter, a holding head for the latter pivotally mounted on said carriage, means operatively coordinated with said head for determining the stroke and angularity of said cutter relative to the tire, power operated means adapted to swing said last-named means and effect a cutting stroke of said cutter, recoil means effecting the return stroke thereof, means for rotatably advancing the tire through a predetermined angle after each power stroke of the cutter, and means whereby said cutter head is resiliently constrained to follow the arcual surface of the tire.

5. In apparatus for treating a tire to increase the non-skid properties thereof, the combination of pivoted support means, a track on said means adjacent the tire, a carriage movable along said track, pressure influenced means on said carriage for coaction with said tire transversely, a cutter, a holder for the latter pivotally supported on said last-named means, and adjuster mechanism fulcrumed on said support means and operatively coordinated with said holder whereby the stroke of the latter and the angular inclination of the cutter relative to the tire are variable.

6. In apparatus for treating a tire to increase the non-skid properties thereof, the combination of pivoted support means, a track on said means adjacent the tire, a carriage movable along said track, a pressure influenced roller on said carriage adapted to engage the surface of said tire, a cutter, a holder for said cutter pivotally supported on the axis of said roller, adjuster means including telescopic components, one of said components being fulcrumed on said support means and operatively connected with said holder, a fluid pressure unit having a movable element, and means connecting said element to the other of said components for effecting a cutting stroke of said cutter.

7. In apparatus of the class described, means for rotatably supporting an article, a cutter for cutting incisions in said article, means for supporting said cutter for movement relative to said article, means for reciprocating said cutter, means for simultaneously adjusting the stroke of said cutter and the angularity thereof relative to the surface of said article, and means coordinated with said cutter reciprocating means for intermittently advancing said article through predetermined angles of rotation.

8. In apparatus of the class described, means for mounting a tire, means for cutting incisions in the surface of said tire, means for supporting said cutting means for pivotal movement about an axis, means including fluid pressure power means for reciprocating said supporting means, and means for simultaneously adjusting said cutting means about said axis and adjusting the length of the stroke of said supporting means.

9. In apparatus of the class described, means for mounting a tire to be cut, means for cutting incisions in said tire, means for movably supporting said cutting means, power means for moving said cutting means in one direction relative to said article to make said incisions, and resilient means for returning said cutting means to its initial position.

10. In apparatus of the class described, means for mounting a tire, means for cutting incisions in said tire, means for movably supporting said cutting means, and means for reciprocating said cutting means relative to said tire including fluid pressure power means for moving said cutting means in one direction and resilient means for moving said cutting means in the other direction.

11. In apparatus of the class described, means for mounting a tire, means for cutting incisions in said tire, means for movably supporting said cutting means, means for reciprocating said cutting means relative to said tire including fluid pressure power means for moving said cutting means in one direction and resilient means for moving said cutting means in the other direction, and means for varying the stroke through which said cutting means is moved by said power means.

12. In apparatus of the class described, means for rotatably supporting a tire, means for cutting incisions in the surface of said tire, means including fluid pressure power means for moving said cutting means to make said incisions, and means controlled by said power means and including a second fluid pressure power means for rotating said tire through a predetermined angular distance after each cutting operation of said cutting means.

13. In apparatus of the class described, means for rotatably supporting a tire, means for cutting incisions in the surface of said tire, means including fluid pressure power means for moving said cutting means to make said incisions, means including a second fluid pressure power means for rotating said tire through a predetermined angular distance after each cutting operation of said cutting means, valve means for controlling the fluid pressures in said power means, and means controlled by said first-named power means for actuating said valves.

14. In apparatus of the class described, means for rotatably supporting a tire, means for cutting incisions in the surface of said tire, means including a fluid pressure power unit for moving said cutting means to make said incisions, and means controlled by said power unit for rotating said tire through a predetermined angular distance after each cutting operation of said cutting means.

15. In apparatus of the class described, means for mounting a tire, mechanism including means for treating said tire and power means for imparting reciprocating movement to said treating means, and means including resilient means whereby said mechanism is resiliently constrained to follow the arcual surface of said tire.

16. In apparatus of the class described, means for rotatably mounting a tire, means for cutting incisions in the surface of said tire, means for movably mounting said cutting means, power means for actuating said cutting means to make the incisions in said tire, fluid pressure power means for intermittently rotating said tire, and means controlled by said first-named power means for controlling the fluid pressure in said second-named power means.

17. In apparatus of the class described, means for rotatably mounting a tire, means for cutting incisions in the surface of said tire, means for movably mounting said cutting means, fluid pressure power means for actuating said cutting means to make incisions in said tire, power means for intermittently rotating said tire, and means controlled by said fluid pressure power means for rendering said second named power means operative to rotate said tire.

18. In apparatus of the class described, means for rotatably mounting a tire, means for cutting incisions in the surface of said tire, means for movably mounting said cutting means, fluid pressure power means for reciprocating said cutting means and intermittently rotating said tire through predetermined angular distances, valve means for controlling the fluid pressures in said power means, and means operable in accordance with the movement of said cutting means for controlling said valve means.

19. In apparatus for treating a tire to increase the non-skid properties thereof, the combination of a frame, a support pivotally mounted on said frame, means for yieldingly holding a part of said support in contact with the surface of said tire, a carriage movably mounted on said support, means mounted on said carriage for making incisions in said tire, means mounted on said carriage for controlling the depth of said incisions, means for yieldingly holding said control means in engagement with the surface of said tire, and means mounted on said support for reciprocating said carriage on said support.

20. In apparatus of the class described, means for rotatably mounting a tire, a pivoted support, means movably mounted on said support for treading said tire, means for resiliently pressing the treading means against the tire, means for limiting and controlling the depth of the tread, means mounted on said pivoted support for reciprocating said treading means, and means for rotating said tire.

21. In apparatus of the class described, the combination of supporting means, guide means thereon, a carriage supported by said guide means comprising two relatively movable members, means for limiting the relative movement of said members, resilient means interposed between said members, one of said members having operative engagement with said guide means, a roller rotatably mounted on the other of said members, and a cutter mounted on said last-named member for pivotal movement about the axis of said roller.

22. In apparatus of the class described, supporting means, a carriage movably mounted on said supporting means, a roller mounted on said carriage for linear and rotary movement relative thereto, means for yieldingly resisting said linear movement, and cutting means mounted for linear movement with said roller and for angular movement about the axis of rotation of said roller.

23. In apparatus for treating a tire to increase the non-skid properties thereof, supporting means, means movably mounted on said supporting means for cutting incisions in said tire, means for moving said cutting means relative to said tire for making the incisions therein including a link, pivot means for securing said link to said supporting means, means operatively connecting said link and said cutting means, power means having a constant-stroke reciprocating element, pivot means for operatively connecting said movable element to said link, and means for moving said last-named pivot means longitudinally of said link relative to said first-named pivot means for varying the stroke of said cutting means.

WILLIAM F. ERRIG.
GEORGE M. PFUNDT.